UNITED STATES PATENT OFFICE.

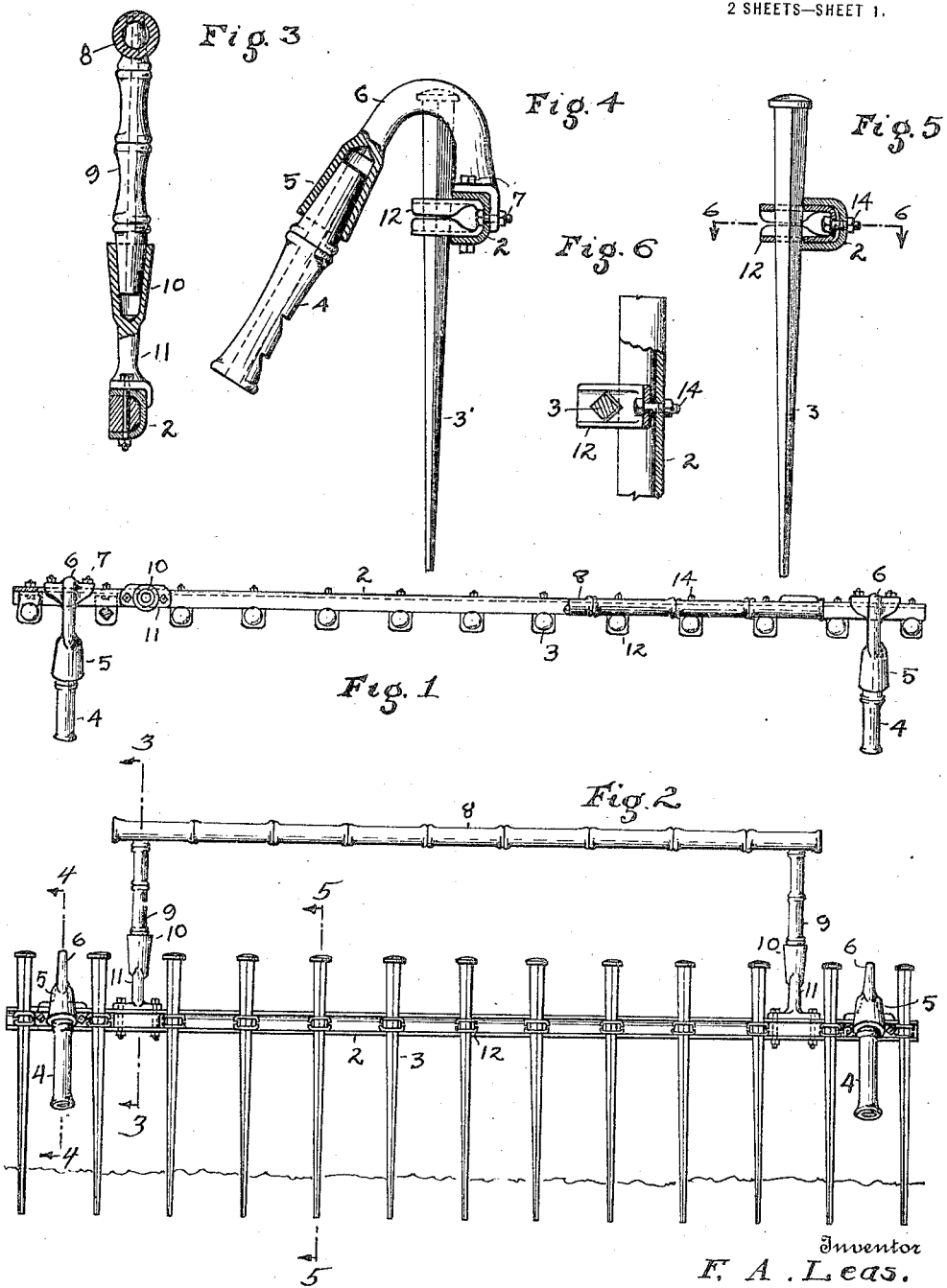

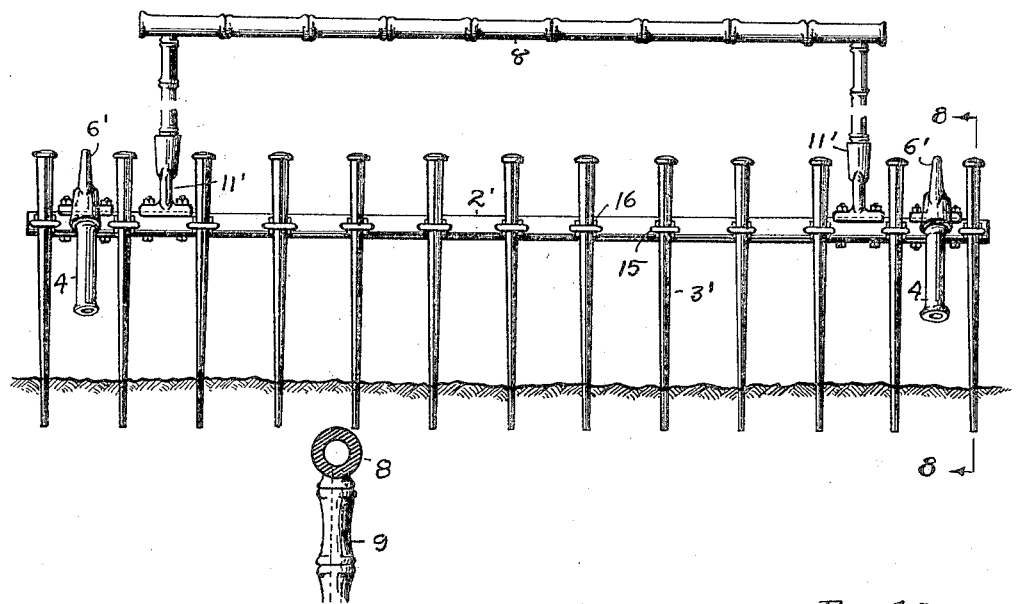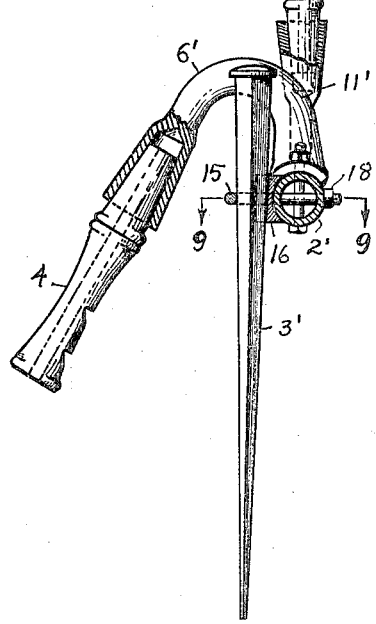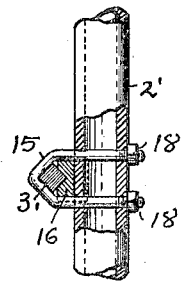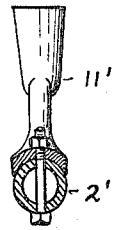

FREDERICK A. LEAS, OF MANILA, PHILIPPINE ISLANDS.

RICE RAKE OR HARROW.

1,390,208.  Specification of Letters Patent.  Patented Sept. 6, 1921.

Application filed February 7, 1920. Serial No. 356,906.

*To all whom it may concern:*

Be it known that I, FREDERICK A. LEAS, a citizen of the United States, residing at Manila, Philippine Islands, have invented certain new and useful Improvements in a Rice Rake or Harrow, of which the following is a specification.

This invention relates to a rake or harrow especially adapted for use in rice fields, and the invention comprises a construction and arrangement of parts substantially as herein shown and described and more particularly pointed out in the claims.

In the accompanying drawings, Figure 1 is a plan view of the implement and Fig. 2 is a front elevation thereof. Fig. 3 is an enlarged cross section on line 3—3, Fig. 2, and Fig. 4 is a similar view on line 4—4, Fig. 2. Fig. 5 is a cross section on line 5—5, Fig. 2. Fig. 6 is a horizontal section on line 6—6, Fig. 5. Figs. 7-10, inclusive, show a modification in which views Figs. 8 and 9 are cross sections on lines 8—8 and 9—9 of Figs. 7 and 8, respectively.

The present implement is primarily intended for the cultivation of rice fields, and comprises a single straight beam or bar 2 which is adapted to support a series of teeth 3 in spaced relation vertically at the front side of said bar or beam. As shown, these teeth are angular in cross section and taper longitudinally and are held in place by suitable clamping means. In use, the teeth are drawn forwardly through the ground by pull applied to short pieces of wood 4 extending downwardly and forwardly at an inclination at the front side of the beam where a hitch or trace connection may be made with the draft animal. Piece 4 is removably held within a tapered socket 5 which is formed in the end of an arched bracket 6 secured to the top of the rear side of the beam 2 by bolts 7. The socket portion of bracket 6 inclines downwardly and forwardly at the front side of the beam at an angle of approximately thirty degrees so that the insert member 4 may be projected close to the ground and the pull on this member will be applied to the beam and its teeth at a point in a plane between the beam and the point of the teeth. When the teeth are being pulled through the earth the implement is steadied by the operator, who walks behind the implement with his hands on a horizontal handle bar 8 which is supported parallel with and directly above beam 2. This handle bar is supported by two upright pieces 9 which are driven into tapered sockets 10 forming part of separate brackets 11 bolted at each end and to the top side of beam 2.

In Figs. 1 to 6, inclusive, beam 2 is of U-shape made of relatively light thin metal, and the clamping means for the teeth comprise U-shaped clips 12 having openings in their opposite faces adapted to receive the teeth and being provided with bolts 14 at their inner ends adapted to draw and secure the clips within the beam and to clamp the teeth tightly against the front edges of the top and bottom flanges of the beam.

In Figs. 7-10, inclusive, the beam 2' is in the form of a round tube, and the separate draft and handle brackets 6' and 11' are bolted or riveted to the beam, and the teeth 3' fastened by U-bolts 15 and saddle pieces 16. The U-bolts extend through horizontal openings in the round beam and clamping union is effected by nuts 18 at the rear side of the beam.

The implement is especially useful for puddling rice fields plowed under water prior to setting out the rice plants, and also serves the purpose of cleaning the submerged land of weeds and other foreign or obstructing matter and to break up the clods and level and smooth the ground.

Being submerged the operator walks behind and holds the implement to its work, thus distinguishing it from the ordinary land harrow or drag. A horizontal handle is used directly above the bar and teeth, and the operator is enabled thereby to prevent the device from tilting and to change the angle as in dumping gathered matter.

What I claim is:

1. A rice rake or harrow, comprising a beam having a draft bracket at each end extending downwardly and forwardly in respect to the beam and provided with socket pieces for a handle at the upper side thereof and carrying a series of teeth.

2. A rice rake or harrow, comprising a straight beam having an arched bracket at each end thereof provided with a socket and extending downwardly and forwardly at the front side of the beam, brackets fixed to the top of said beam having sockets for a handle, and teeth fixed at spaced intervals on said beam.

3. A rice rake or harrow, comprising a hollow metal beam of light weight having at each end an arched bracket with an inclined socket adapted to receive a hitch member and also having vertical brackets with sockets adapted to receive handle pieces, and a series of teeth and means adapted to attach the teeth at spaced intervals in a vertical position upon said beam.

4. A rice rake or harrow, comprising a U-shaped beam of metal, a series of teeth and means adapted to clamp said teeth in a vertical position at the front side of said beam, an arched bracket at each end of said beam having a downwardly inclined socket adapted to receive a hitch member, and vertical sockets at opposite ends of said beam adapted to receive handle members.

5. A rice rake or harrow, comprising a metal beam, a series of teeth and clamping members adapted to secure said teeth to said beam, arched socket brackets fixed to said beam between its ends adapted to receive hitch members, and socket brackets secured to said beam adapted to receive handle members.

Signed at Cleveland, in the county of Cuyahoga and State of Ohio, this 22d day of January, 1920.

FREDERICK A. LEAS.